(12) United States Patent
Franklin et al.

(10) Patent No.: US 6,382,720 B1
(45) Date of Patent: May 7, 2002

(54) RETRACTABLE SEAT COVERING

(76) Inventors: Alex Franklin; Sheena Franklin, both of 16009 Hilton, Southfield, MI (US) 48078

( * ) Notice: Subject to any disclaimer, the term of this patent is extended or adjusted under 35 U.S.C. 154(b) by 0 days.

(21) Appl. No.: 09/791,208

(22) Filed: Feb. 23, 2001

(51) Int. Cl.$^7$ ................................................ A47C 31/11
(52) U.S. Cl. .................. 297/228.13; 297/229; 297/221
(58) Field of Search .......................... 297/228.13, 221, 297/226, 229, 219.1

(56) References Cited

U.S. PATENT DOCUMENTS

| | | | | |
|---|---|---|---|---|
| 974,865 | A | * 11/1910 | Dreher | 297/228.13 |
| 1,051,566 | A | * 1/1913 | Dreher | 297/226 |
| 1,208,121 | A | * 12/1916 | Fitzgerald | 297/228.13 |
| 1,985,222 | A | 12/1934 | Menhall | |
| 2,804,914 | A | 9/1957 | Butcko et al. | |
| 4,320,922 | A | 3/1982 | Meritis | 297/229 X |
| 4,600,238 | A | 7/1986 | Goodford | 297/228.13 X |
| 4,723,814 | A | * 2/1988 | Hunt | 297/228.13 X |
| 4,790,592 | A | * 12/1988 | Busso et al. | 297/229 X |
| D343,326 | S | 1/1994 | Bruce | |
| 5,330,251 | A | 7/1994 | McGuire | 297/229 |

* cited by examiner

Primary Examiner—Peter M. Cuomo
Assistant Examiner—Rodney B. White

(57) ABSTRACT

A retractable seat covering for covering a seat to keep it clean and prevent sun damage thereto. The retractable seat covering includes a housing. The housing has a front wall, a back wall, a pair of side walls, and a bottom wall. A top side of the housing is open for access into the housing. A bottom portion of the housing has a cylindrical shape. A spindle extends between and is securely attached to the side walls. The spindle is positioned in the bottom portion of the housing. A tubular member is rotatably positioned on the spindle such that the spindle extends through the tubular member. A biasing means biases rotation of the tubular member in a first direction. A panel has a top edge, a bottom edge, and a pair of side edges. The bottom edge of the panel is securely attached to the tubular member. The panel is wrapped about the tubular member such that the panel may extend outwardly of the housing by rotating the tubular member in a second direction. A mounting means mounts the housing to a front side of a seat so that the panel may be removed from the housing and positioned over the seat.

9 Claims, 4 Drawing Sheets

RETRACTABLE SEAT COVERING

BACKGROUND OF THE INVENTION

1. Field of the Invention

The present invention relates to seat covering devices and more particularly pertains to a new retractable seat covering for covering a seat to keep it clean and prevent sun damage thereto.

2. Description of the Prior Art

The use of seat covering devices is known in the prior art. More specifically, seat covering devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,600,238; 1,985,222; 2,804,914; 4,320,922; 5,330,251; and 343,326.

While these devices fulfill their respective, particular objectives and requirements, the aforementioned patents do not disclose a new retractable seat covering. The inventive device includes a housing. The housing has a front wall, a back wall, a pair of side walls, and a bottom wall. A top side of the housing is open for access into the housing. A bottom portion of the housing has a cylindrical shape. A spindle extends between and is securely attached to the side walls. The spindle is positioned in the bottom portion of the housing. A tubular member is rotatably positioned on the spindle such that the spindle extends through the tubular member. A biasing means biases rotation of the tubular member in a first direction. A panel has a top edge, a bottom edge, and a pair of side edges. The bottom edge of the panel is securely attached to the tubular member. The panel is wrapped about the tubular member such that the panel may extend outwardly of the housing by rotating the tubular member in a second direction. A mounting means mounts the housing to a front side of a seat so that the panel may be removed from the housing and positioned over the seat.

In these respects, the retractable seat covering according to the present invention substantially departs from the conventional concepts and designs of the prior art, and in so doing provides an apparatus primarily developed for the purpose of covering a seat to keep it clean and prevent sun damage thereto.

SUMMARY OF THE INVENTION

In view of the foregoing disadvantages inherent in the known types of seat covering devices now present in the prior art, the present invention provides a new retractable seat covering construction wherein the same can be utilized for covering a seat to keep it clean and prevent sun damage thereto.

The general purpose of the present invention, which will be described subsequently in greater detail, is to provide a new retractable seat covering apparatus and method which has many of the advantages of the seat covering devices mentioned heretofore and many novel features that result in a new retractable seat covering which is not anticipated, rendered obvious, suggested, or even implied by any of the prior art seat covering devices, either alone or in any combination thereof.

To attain this, the present invention generally comprises a housing. The housing has a front wall, a back wall, a pair of side walls, and a bottom wall. A top side of the housing is open for access into the housing. A bottom portion of the housing has a cylindrical shape. A spindle extends between and is securely attached to the side walls. The spindle is positioned in the bottom portion of the housing. A tubular member is rotatably positioned on the spindle such that the spindle extends through the tubular member. A biasing means biases rotation of the tubular member in a first direction. A panel has a top edge, a bottom edge, and a pair of side edges. The bottom edge of the panel is securely attached to the tubular member. The panel is wrapped about the tubular member such that the panel may extend outwardly of the housing by rotating the tubular member in a second direction. A mounting means mounts the housing to a front side of a seat so that the panel may be removed from the housing and positioned over the seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable seat covering apparatus and method which has many of the advantages of the seat covering devices mentioned heretofore and many novel features that result in a new retractable seat covering which is not anticipated, rendered obvious, suggested, or even implied by any of the prior art seat covering devices, either alone or in any combination thereof.

It is another object of the present invention to provide a new retractable seat covering which may be easily and efficiently manufactured and marketed.

It is a further object of the present invention to provide a new retractable seat covering which is of a durable and reliable construction.

An even further object of the present invention is to provide a new retractable seat covering which is susceptible of a low cost of manufacture with regard to both materials and labor, and which accordingly is then susceptible of low prices of sale to the consuming public, thereby making such retractable seat covering economically available to the buying public.

Still yet another object of the present invention is to provide a new retractable seat covering which provides in the apparatuses and methods of the prior art some of the advantages thereof, while simultaneously overcoming some of the disadvantages normally associated therewith.

Still another object of the present invention is to provide a new retractable seat covering for covering a seat to keep it clean and prevent sun damage thereto.

Yet another object of the present invention is to provide a new retractable seat covering which includes a housing. The housing has a front wall, a back wall, a pair of side walls, and a bottom wall. A top side of the housing is open for access into the housing. A bottom portion of the housing has a cylindrical shape. A spindle extends between and is securely attached to the side walls. The spindle is positioned in the bottom portion of the housing. A tubular member is rotatably positioned on the spindle such that the spindle extends through the tubular member. A biasing means biases rotation of the tubular member in a first direction. A panel has a top edge, a bottom edge, and a pair of side edges. The bottom edge of the panel is securely attached to the tubular member. The panel is wrapped about the tubular member such that the panel may extend outwardly of the housing by rotating the tubular member in a second direction. A mounting means mounts the housing to a front side of a seat so that the panel may be removed from the housing and positioned over the seat.

Still yet another object of the present invention is to provide a new retractable seat covering that is retrofittable to existing seats.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
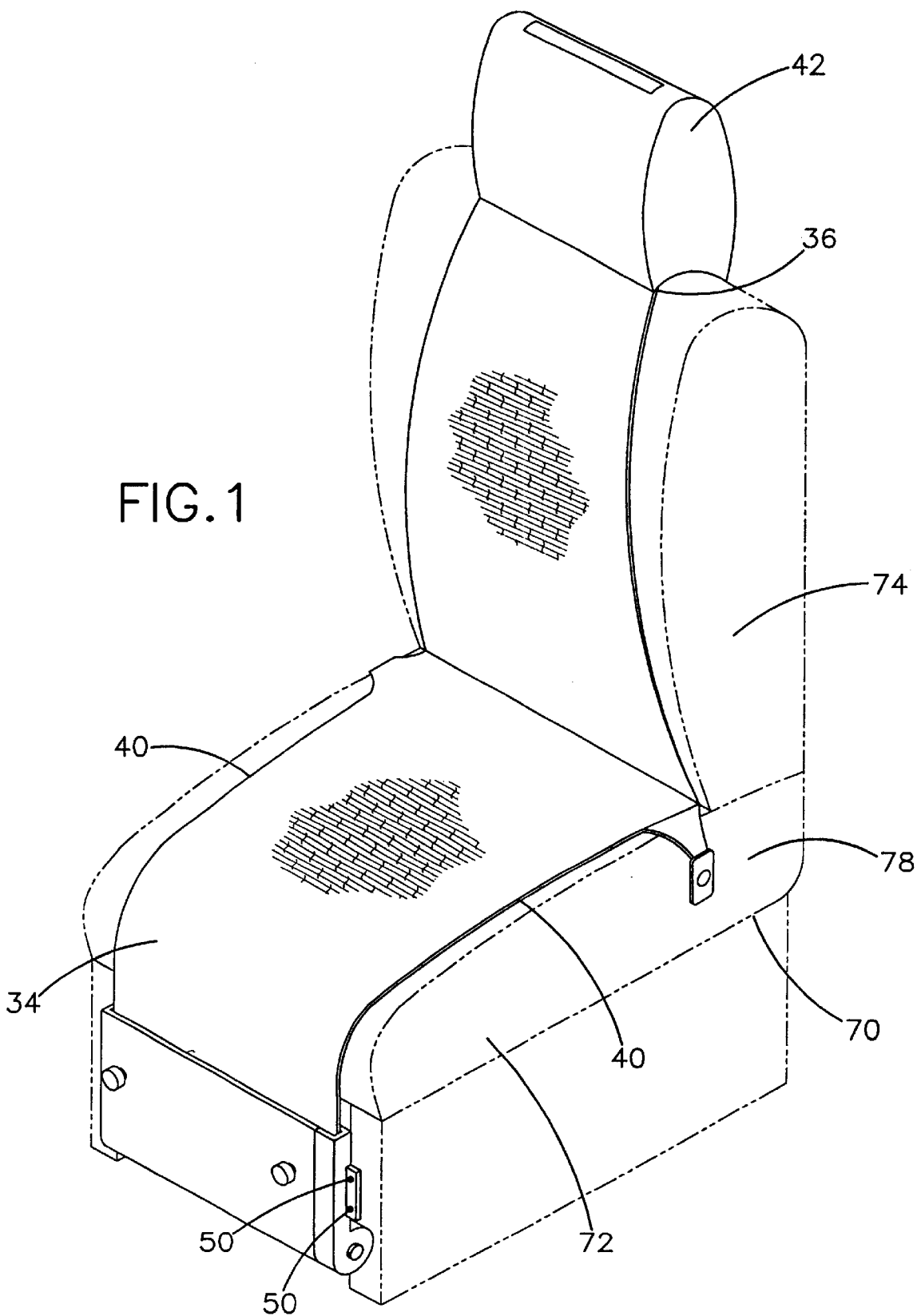
FIG. 1 is a schematic perspective view of a new retractable seat covering according to the present invention.
Figure 2:
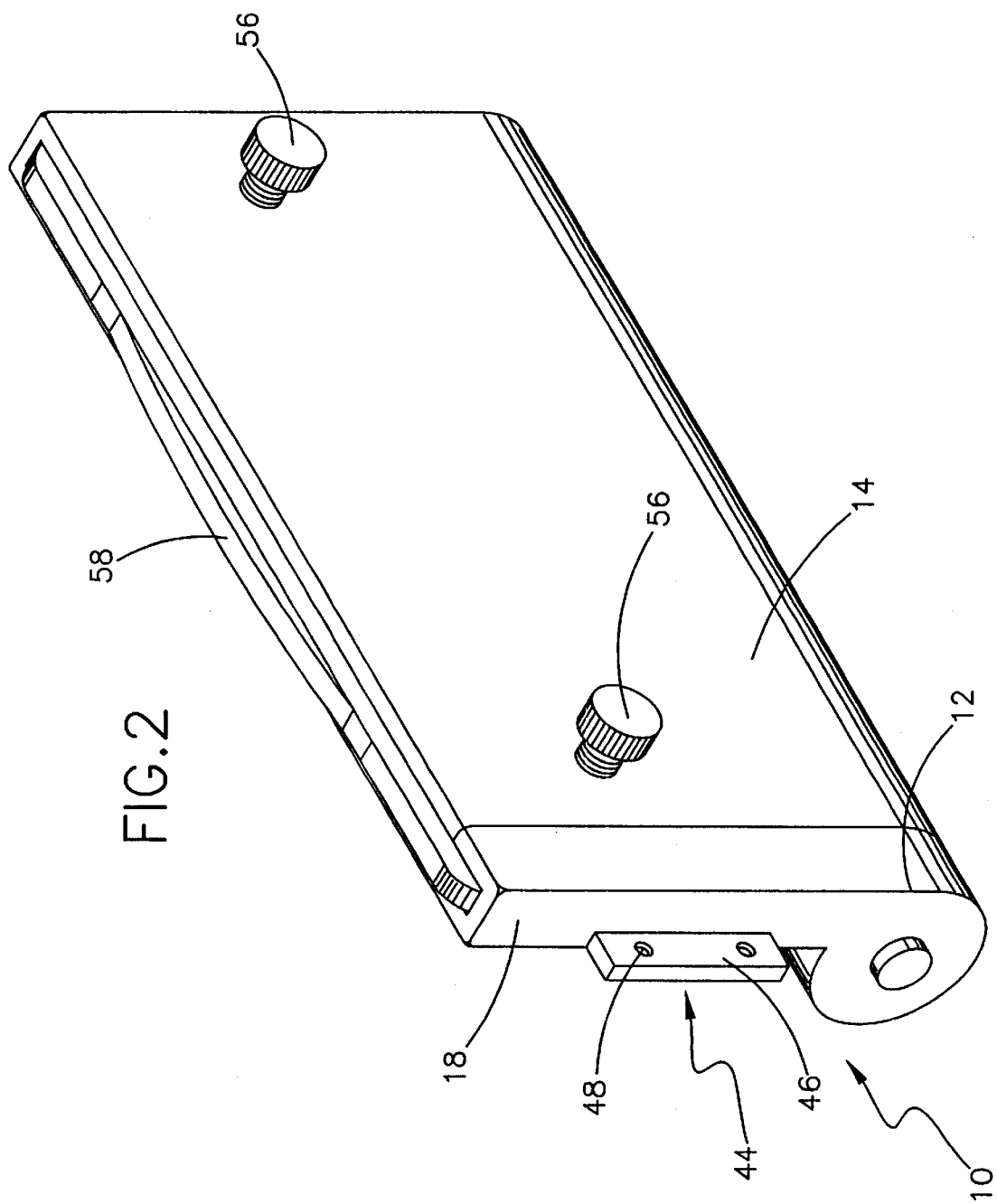
FIG. 2 is a schematic perspective view of the present invention.

With reference now to the drawings, and in particular to FIGS. 1 through 5 thereof, a new retractable seat covering embodying the principles and concepts of the present invention and generally designated by the reference numeral 10 will be described.

As best illustrated in FIGS. 1 through 5, the retractable seat covering 10 generally comprises positionable over an automobile seat 70. The seat 70 has a seat portion 72, a back portion 74, a head rest 76, and a pair of sides 78. The device 10 includes a housing 12. The housing 12 has a front wall 14, a back wall 16, a pair of side walls 18, and a bottom wall 20. A top side 22 of the housing 12 is open for access into the housing. A bottom portion 24 of the housing 12 has a cylindrical shape.

A spindle 26 extends between and is securely attached to the side walls 18. The spindle 26 is positioned in the bottom portion 24 of the housing 12. A tubular member 30 is rotatably positioned on the spindle 26 such that the spindle 26 extends through the tubular member 30. A biasing means 32 biases rotation of the tubular member 30 in a first direction. The biasing means 32 is securely coupled to the spindle 26 and the tubular member 30. The biasing means 32 preferably comprises a coil spring.

A panel 34 has a top edge 36, a bottom edge 38, and a pair of side edges 40. The bottom edge 38 of the panel 34 is securely attached to the tubular member 30. The panel 34 is wrapped about the tubular member 30 such that the panel 34 may extend outwardly of the housing 12 by rotating the tubular member 30 in a second direction. The top edge 36 of the panel 34 has a sleeve 42 integrally coupled thereto. The sleeve 42 has a shape adapted for positioning over the head rest 76. The panel 34 preferably comprises a cloth material, though a paper material is also envisioned.

Figure 3:
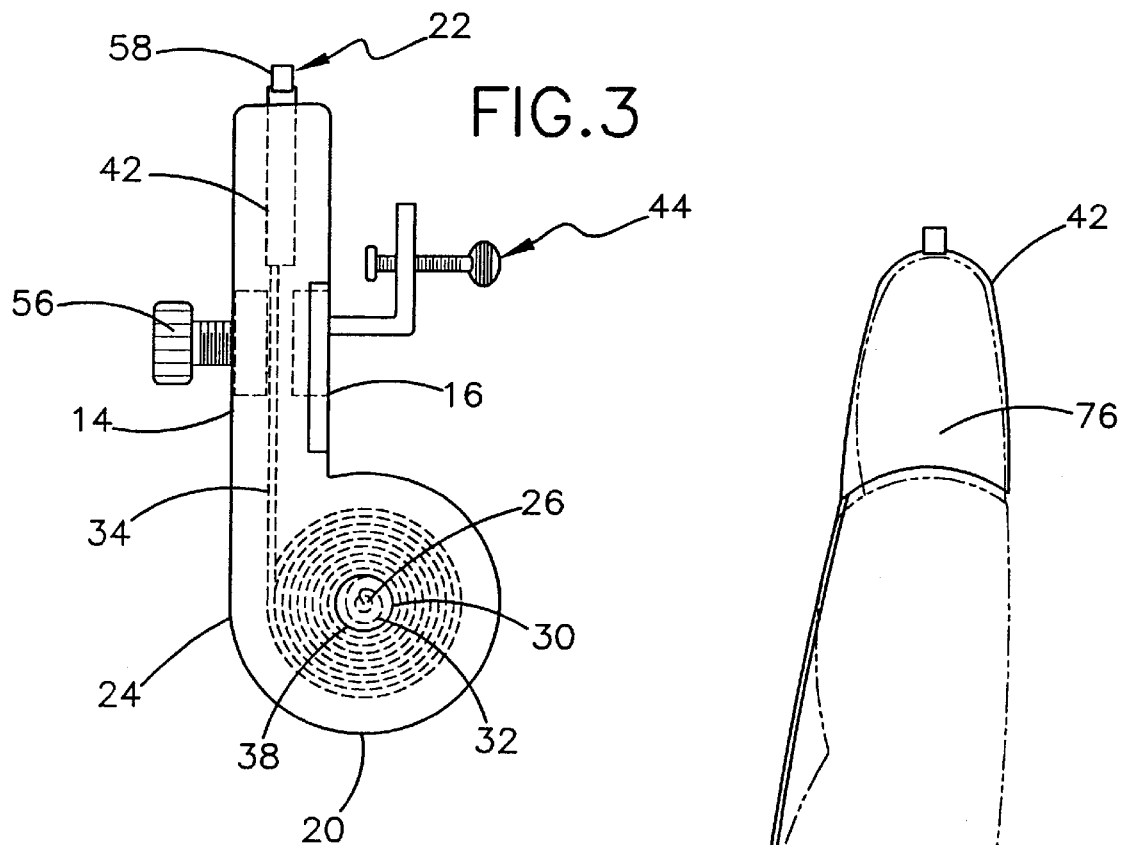
FIG. 3 is a schematic side view of the present invention.
Figure 4:
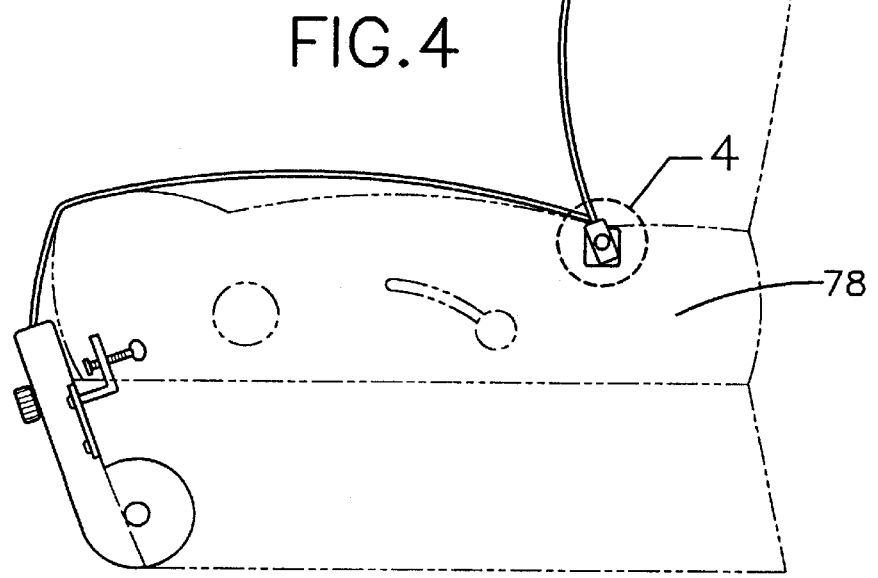
FIG. 4 is a schematic side view of the present invention.
Figure 5:
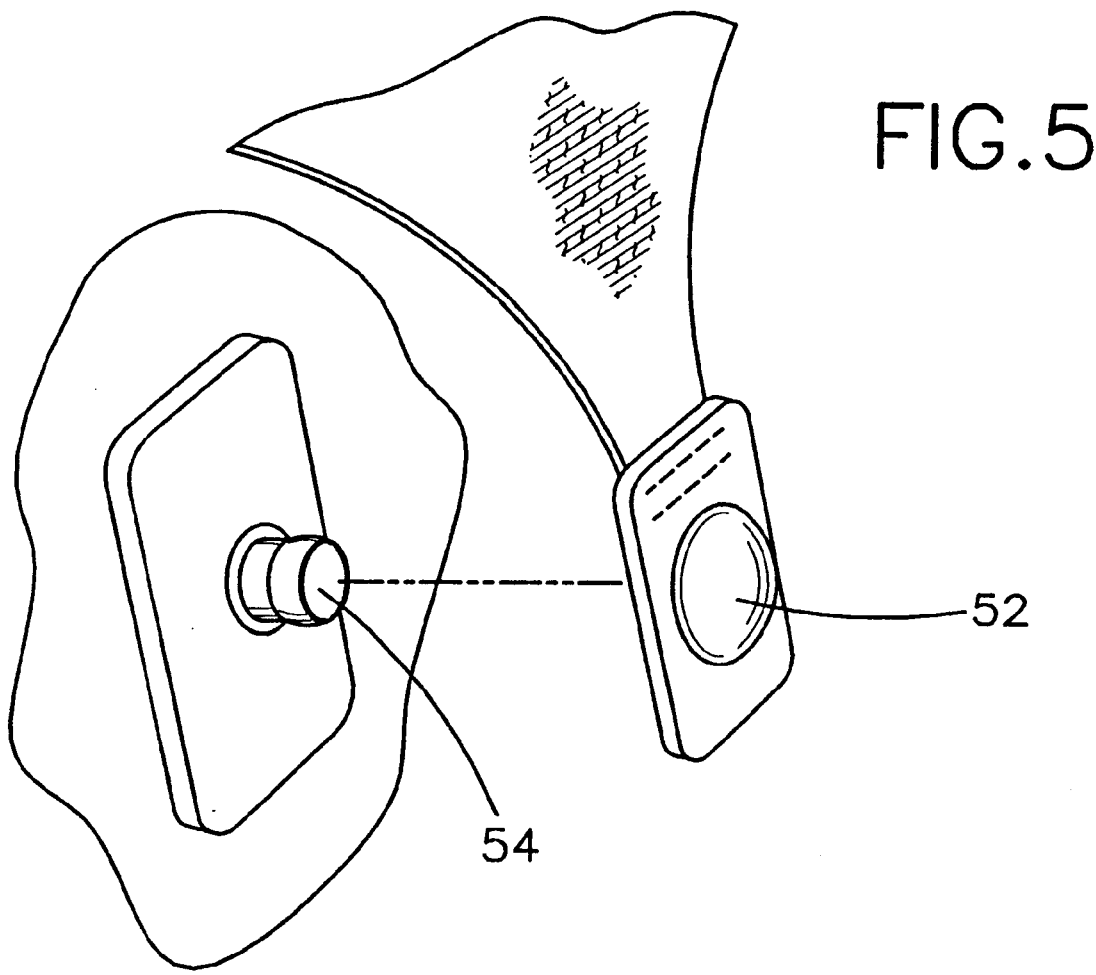
FIG. 5 is a schematic exploded view of the securing means of the present invention.

A mounting means 44 mounts the housing 12 to a front side of the seat portion 70. The mounting means 44 preferably comprises a pair of tabs 46. Each of the tabs 46 is integrally coupled to and extends away from one of the side walls 18. Each of the tabs 46 has a pair of holes 48 therethrough. Each of a plurality of fastening means 50 for fastening the housing to the seat portion is extendable through one of the holes 48. The fastening means 50 are preferably conventional screws. FIGS. 3 and 4 show an alternative mounting means 44 which acts as a clip to clip to the underside of the seat 70.

A pair of securing means removably secures the side edges of the panel 40 to the seat 70. Each of the securing means comprises a snap having a female portion 52 and a male portion 54. Each of the male portions 54 is coupled to one of the sides of the seat 70, and each is positioned generally adjacent to a juncture of the seat portion 72 and the back portion 74. Each of the female portions 52 is coupled to one of the side edges 40 and positioned such that each may coupled to one of the male portions 54 when the sleeve 42 is positioned over the head rest 76.

A pair of biasing members 56 may be used for biasing against the panel 34 in the housing. Each of the biasing members 56 extends into the front wall 14. Each of the biasing members 56 is selectively positionable against the panel 34 by screwing them in. When positioned against the panel 34, the biasing means 32 may not retract the panel 40.

A handle member 58 is securely attached to the sleeve 42. The handle member 58 assists in removing the panel from the housing.

In use, the device is attached to the front portion of a seat. The panel is extracted and placed over the seat. The sleeve is positioned over the head rest and the securing means secured to hold the panel in position. The panel then protects the seat from dirt, wear and tear, and from sun damage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A retractable seat cover device, said device being positionable over an automobile seat, the seat having a seat portion, a back portion, a head rest, and a pair of sides, said device comprising:
    a housing, said housing having a front wall, a back wall, a pair of side walls, and a bottom wall, a top side of said housing being open for access into said housing, a bottom portion of said housing having a cylindrical shape;
    a spindle, said spindle extending between and being securely attached to said side walls, said spindle being positioned in said bottom portion of said housing;
    a tubular member, said tubular member being rotatably positioned on said spindle such that said spindle extends through said tubular member;
    a biasing means for biasing rotation of said tubular member in a first direction;
    a panel, said panel having a top edge, a bottom edge, and a pair of side edges, said bottom edge of said panel being securely attached to said tubular member, said panel being wrapped about said tubular member such that said panel may extend outwardly of said housing by rotating said tubular member in a second direction; and
    a mounting means for mounting said housing to a front side of said seat portion.

2. The retractable seat cover device as in claim 1, wherein said panel further comprises:
    said top edge of said panel having a sleeve integrally coupled thereto, said sleeve having a shape adapted for positioning over said head rest.

3. The retractable seat cover device as in claim 2, further comprising:
    a pair of securing means for removably securing said side edges of said panel to said seat.

4. The retractable seat cover device as in claim 3, wherein each of said securing means comprises:
    a snap having a female portion and a male portion, each of said male portions being coupled to one of the sides of the seat, each being positioned generally adjacent to a juncture of the seat portion and the back portion, each of said female portions being coupled to one of the side edges and positioned such that each may be coupled to one of the male portions when said sleeve is positioned over the head rest.

5. The retractable seat cover device as in claim 1, wherein said mounting means comprises:
    a pair of tabs, each of said tabs being integrally coupled to and extending away from one of said side walls, each of said tabs having a pair of holes therethrough, each of a plurality of fastening means for fastening said housing to said seat portion being extendable through one of said holes.

6. The retractable seat cover device as in claim 1, further comprising:
    a pair of securing means for removably securing said side edges of said panel to said seat.

7. The retractable seat cover device as in claim 6, wherein each of said securing means comprises:
    a snap having a female portion and a male portion, each of said male portions being coupled to one of the sides of the seat, each being positioned generally adjacent to a juncture of the seat portion and the back portion.

8. The retractable seat cover device as in claim 1, further comprising:
    a pair of biasing members for biasing against said panel in said housing, each of said biasing members extending into said front wall, each of said biasing members being selectively positionable against said panel.

9. A retractable seat cover device, said device being positionable over an automobile seat having a seat portion, a back portion, a head rest, and a pair of sides, said device comprising:
    a housing, said housing having a front wall, a back wall, a pair of side walls, and a bottom wall, a top side of said housing being open for access into said housing, a bottom portion of said housing having a cylindrical shape;
    a spindle, said spindle extending between and being securely attached to said side walls, said spindle being positioned in said bottom portion of said housing;
    a tubular member, said tubular member being rotatably positioned on said spindle such that said spindle extends through said tubular member;
    a biasing means for biasing rotation of said tubular member in a first direction, said biasing means being securely coupled to said spindle and said tubular member, said biasing means comprising a coil spring;
    a panel, said panel having a top edge, a bottom edge, and a pair of side edges, said bottom edge of said panel being securely attached to said tubular member, said panel being wrapped about said tubular member such that said panel may extend outwardly of said housing by rotating said tubular member in a second direction, said top edge of said panel having a sleeve integrally coupled thereto, said sleeve having a shape adapted for positioning over said head rest, said panel comprising a cloth material;
    a mounting means for mounting said housing to a front side of said seat portion, said mounting means comprising a pair of tabs, each of said tabs being integrally coupled to and extending away from one of said side walls, each of said tabs having a pair of holes therethrough, each of a plurality of fastening means for fastening said housing to said seat portion being extendable through one of said holes;
    a pair of securing means for removably securing said side edges of said panel to said seat, each of said securing means comprising a snap having a female portion and a male portion, each of said male portions being coupled to one of the sides of the seat, each being positioned generally adjacent to a juncture of the seat portion and the back portion, each of said female portions being coupled to one of the side edges and positioned such that each may coupled to one of the male portions when said sleeve is positioned over the head rest;

a pair of biasing members for biasing against said panel in said housing, each of said biasing members extending into said front wall, each of said biasing members being selectively positionable against said panel; and a handle member, said handle member being securely attached to said sleeve.

* * * * *